(12) United States Patent
Zaringhalam

(10) Patent No.: US 6,578,195 B1
(45) Date of Patent: Jun. 10, 2003

(54) PROCESS FOR DATA ENCAPSULATION IN LARGE SCALE LEGACY SOFTWARE

(75) Inventor: Ali R. Zaringhalam, North Caldwell, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/474,639

(22) Filed: Dec. 29, 1999

(51) Int. Cl.[7] .................................................. G06F 9/45
(52) U.S. Cl. ...................... 717/140; 717/116; 717/139; 717/149
(58) Field of Search ................................. 717/159, 157, 717/165, 147, 116, 140, 149, 100, 167, 139; 710/313; 707/1, 102; 709/100

(56) References Cited

U.S. PATENT DOCUMENTS

| | | | | |
|---|---|---|---|---|
| 5,764,973 A | * | 6/1998 | Lunceford et al. .............. 707/1 |
| 5,852,731 A | * | 12/1998 | Wang et al. ................. 709/100 |
| 5,960,200 A | * | 9/1999 | Eager et al. ................. 717/147 |
| 6,256,635 B1 | * | 7/2001 | Arrouye et al. .............. 707/102 |
| 6,266,729 B1 | * | 7/2001 | Leung et al. ................ 710/313 |
| 6,272,453 B1 | * | 8/2001 | Hoerig et al. ................ 703/27 |
| 6,305,007 B1 | * | 10/2001 | Mintz .......................... 717/116 |
| 6,339,840 B1 | * | 1/2002 | Kothari et al. ............... 717/149 |
| 6,349,404 B1 | * | 2/2002 | Moore et al. ................ 717/100 |
| 6,356,905 B1 | * | 3/2002 | Gershman et al. ............ 707/10 |
| 6,438,594 B1 | * | 8/2002 | Bowman-Amuah ......... 709/225 |

OTHER PUBLICATIONS

Title: Java based mobile agents, Author: Wong et al, ACM, Mar., 1999.*
Title: Memory allocation for long running server applications, author: Larson et al, ACM, 1998.*
Title: Encapsulating Legacy Software for Use in Client/Server System, author: Sneed, IEEE, 1996.*
Title: Highly Efficient and Encapsulated Re-use of Synchronization Code in Concurrent Object_Oriented Language, author: Matsuoka, ACM, 1993.*
Title: Legacy Systems and Object Technology, author: Jang, source: OOPSLA, Oct., 1995.*
Title: Converting Legacy Code into Ada: A cognitive Approach, autor: Scandura, Source: IEEE, 1994.*
Title: Migrating Legacy Systems towards Object-Oriented Platforms, author: Lucia et al, source: IEEE, 1997.*
Title: Conceptual Module Querying for Software Reengineering, author: Baniassad et al, IEEE, Apr., 1998.*

* cited by examiner

Primary Examiner—Gregory Morse
Assistant Examiner—Chameli C. Das

(57) ABSTRACT

A method for data encapsulation in large scale legacy software code comprising the steps of:

(a) generating a symbol table output from the legacy software code;

(b) automatically scanning the symbol table to determine global variables therein; and (c) replacing the global variables with an object for use in one or more separate object instances.

9 Claims, 1 Drawing Sheet

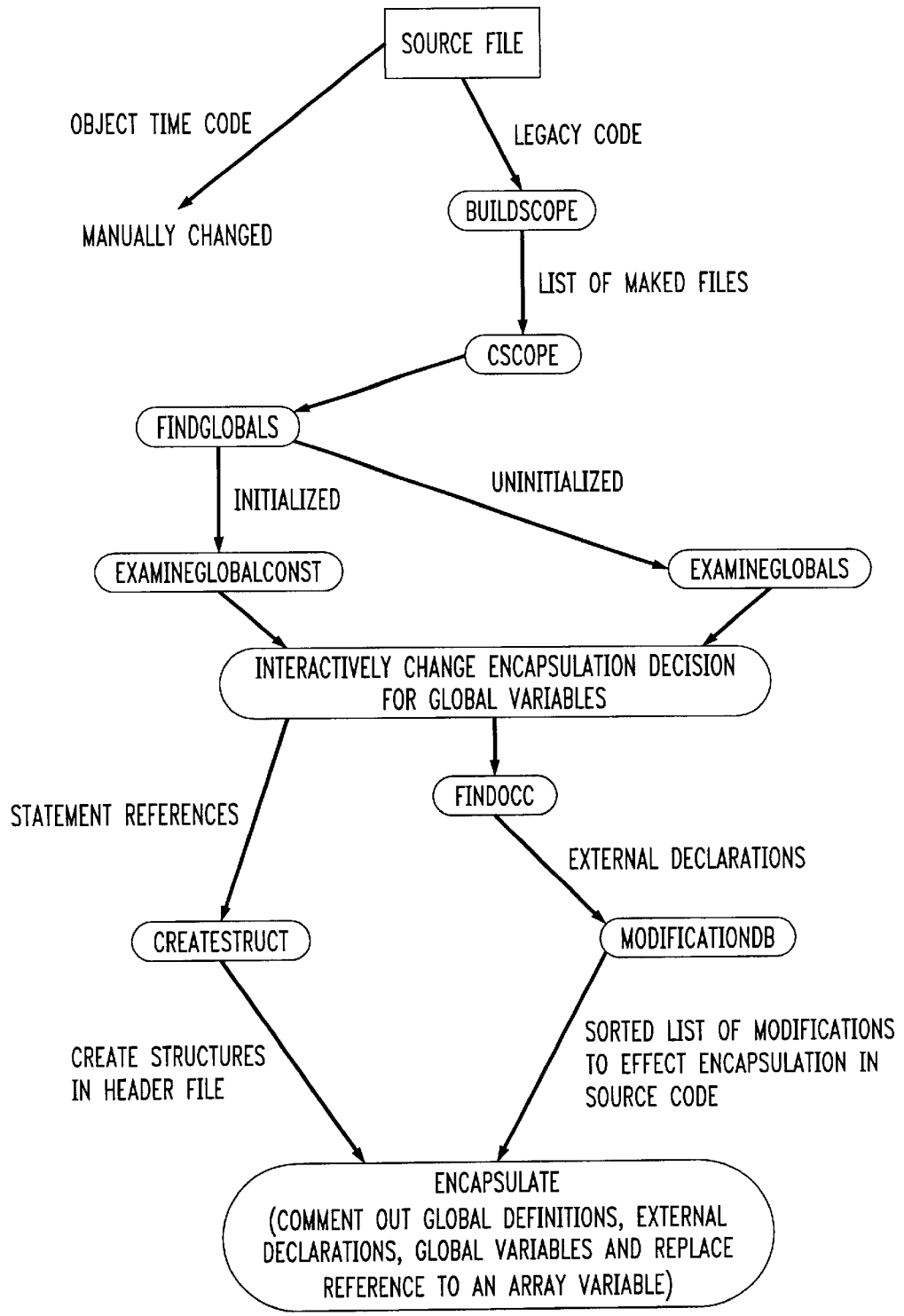

PROCESS FOR DATA ENCAPSULATION IN LARGE SCALE LEGACY SOFTWARE

FIELD OF THE INVENTION

The invention relates to software programming and in particular a method for encapsulating large scale legacy software code.

Reference is hereby made to one microfiche appendix having twenty-nine frames.

BACKGROUND OF THE INVENTION

Older legacy software was typically written using a large set of global variables which could not be used in multiple instances. In an unencapsulated form it is impossible to determine the underlying legacy structure as an object type in which multiple instances can be incarnated.

Encapsulation can be described as the bundling of data together with the member functions describing how the data can be used to form an object. This allows an object to be used in different parts of an application, or different object instances, without affecting the integrity of the data. In other words, the use of an object in one instance leaves data associated with other object instances unaffected.

Improving or writing new software applications, legacy software code may be reused. In such cases, portions of the original legacy code are incorporated into the newly written code requiring the formation of multiple object instances of data from the original legacy code. In such cases its preferred that most, if not all instances of variables with global declarations which are accessible by all functions, be eliminated or otherwise encapsulated to create objects in order to preserve the integrity of the data in the legacy code. While this might be a relatively easy task when a few files and directories are involved, it becomes significantly more tedious, labor intensive and error prone as the scale of the code increases.

Several methods have been used in the art to encapsulate legacy code. The first of these methods is a manual approach. Normally, the code is kept in the original language when the manual approach is used. The manual approach can be laborious and error prone and therefore the cost increases significantly with the size of the code.

A second approach has been to transform the original code into: an object-oriented language such as C++ permitting direct encapsulation of data. This approach is also limited, however, since it is costly and impractical for large scale code. This is especially true if the original code was written prior to the American National Standards Institute Code for "C" with no type checking built in.

In this regard there is a need for a more economical, faster and more reliable method for data encapsulation in large scale legacy software code.

SUMMARY OF THE INVENTION

A method for data encapsulation in large scale legacy software code comprising the steps of:

(a) generating a symbol table output from the legacy software code;

(b) automatically scanning the symbol table to determine global variables therein; and (c) replacing the global variables with an object for use in one or more separate object instances.

BRIEF DESCRIPTION OF THE DRAWINGS

FIG. 1 is a flowchart of the preferred embodiment of the present invention.

DETAILED DESCRIPTION OF THE INVENTION

Data encapsulation is accomplished by implementing a series of scripts, or routines that directly manipulate source code. In one embodiment of this invention script files were developed by the inventor to perform data encapsulation in order to support multiple Virtual Remote Terminals (VRTs) in a single physical digital loop carrier system. A VRT is a software abstraction of a well defined switch interface. Of course, other embodiments may not include the use of multiple operation channels to support multiple VRTs but only the use of objects in one or more object instances in a single application. This embodiment is intended to demonstrate one embodiment of the present invention but it is not intended to limit the scope of the invention in any way.

In this example data encapsulation was performed on ASN.1/CMISE for the Embedded Operations Channel (EOC) of the TR303 switch interface code from release 1.2.1 of AnyMedia® Access System (AMAS) on about 300 files in 20 directories to support VRT in release 1.7 of AMAS. A detailed description of these script files follows immediately and the complete code can be found in the microfiche appendix filed herewith.

An obstacle to having multiple VRT systems is the presence of global variables in the legacy code rendering a large number of functions non-re-entrant and thread unsafe. When functions are non-re-entrant or thread unsafe, operations performed on a data set in one thread of execution may impact the data of another thread of execution. In other words, the use of global variables from older legacy software code create opportunities for corruption of data when the data is not properly encapsulated.

Through the use of the present invention these variables are removed from global scope and replaced with an array of variables for the individual VRTs in the system. An index to the array is determined at run-time by passing the VRT array as an argument to the stack to the functions in the calling sequence.

With this approach, the bulk of the task of converting legacy code to a form to support multiple VRTs reduces to one of editing a large number of files in a predetermined manner. The scripts BuildCscope, FindGlobals, Findocc, Createstruct, ModificationDB, Encapsulate, ExamineGlobalConst, and ExamineGlobals were written in the perl scripting language by the inventor to automate a substantial portion of these modifications. Other scriptions languages could also be used in this invention.

First, a symbol table output of the files to be encapsulated is generated with a compiler such as the GREEN HILL compiler available from Green Hill Software Inc. of Santa Barbara, Calif. Other compilers, which are language translator programs that translate an entire higher level language program into machine language, may also be used with this invention. Variables and references that have been compiled into the code can be readily identified in the resulting symbol table output and located in source code using a source code browser or other means for searching the symbol table output. Preferably CSCOPE, a source code browser developed by Bell Laboratories which is believed to be commercially available is used to find the global variables from the symbol table output although other source code browsers can also be used.

BuildCscope builds a list of legacy files requiring modifications to be processed with CSCOPE. In particular, the script builds a file to be used by CSCOPE to find and encapsulate global variables. It first builds a list of files to be searched for by CSCOPE and puts them in the file CscopeFiles. The only files that are included in the list are those that are in the directory being encapsulated which are in the respective make files.

If a CSCOPE file is built as a part of the automated buildscript routine it may be preferable to narrow the list of scoped files by generating a separate file. This is because CSCOPE "scopes" all files in the subdirectories of directory being encapsulated including those that are not built in the actual load. By narrowing the list of "scoped" files the search can be performed more rapidly.

The encapsulation scripts can only be applied to legacy code. Encapsulation scripts are not normally applied, for instance, to code developed with a software development tool such as ObjectTime® (available from ObjectTime Ltd. of Kanata, Ontario, Canada) or code written in object oriented format. Therefore, to the extent that global variables are referenced in ObjectTime they must be changed manually in an ObjectTime view. There are normally few global variables referenced in ObjectTime code and these cases are flagged as error cases during compilation and linkage.

The purpose of the script FindGlobals is to find global variables compiled into the existing code using the symbol table output from the compiler. This file finds both initialized and uninitialized global variables and stores them in separate files. This file also assigns default encapsulation decisions to these variables. The script findGlobals searches the symbol table output generated by the compiler. When using the preferred GREEN HILLS compiler, findGlobals looks for lines containing the symbols OBJT and GLOB. If a different compiler is used, then findGlobals would be modified to search for corresponding terms designated by the compiler. The findGlobals script also makes a distinction between initialized and uninitialized global variables.

Two assumptions are made with regard to the findGlobals. First, that initialized global variables are shared by all embedded operation channels. In this case they are regarded as global constants. Second, that uninitialized global variables are encapsulated with separate instances used by each embedded operation channel. Each of the two categories is stored in separate files for further processing by other scripts.

It is also noted that the above assumptions are starting assumptions which can be examined and changed using two scripts examinGlobalConsts and examineGlobals. Both scripts use CSCOPE interactively to change the default assumption. The default assumption is tagged as "yes" for uninitialized globals and "no" for initialized global variables.

The objective is to allow encapsulation on a directory by directory basis. References to global variables found in each directory are stored in a first directory for uninitialized global variables and a separate directory for initialized global variables. File names for these directories indicate the directory targeted for encapsulation. The format of records in each file provides information for further processing. For example, in the file globalList.am-asn1 we have:

asnp_qid:unsigned long asnp_qid:/vobs/amas24/sw/SLC5/am-asn1/src/tsk_ASNA.c:170:yes.

This contains the name, types, file name and line number containing the definition. The last field is the default assumption for encapsulation ("yes" for uninitialized globals).

A subroutine, findGlobalnames, finds the list of directories to be encapsulated and if nothing is specified on the command line then it processes all directories. Here is an example of a line being processed:

[18] | 4| 4|OBJT |GLOB |0 |COMMON invokeIDctr|

The non-zero number preceding "|OBJT" indicates storage allocation by the compiler. These entries will need to be processed further. If the non-zero storage allocation finds a variable name (e.g., "invokeIDctr" in the above example) then CSCOPE -L, which performs a single search with line oriented output, is used to find a list of definitions. Typically, statements in header files are excluded because they do not cause storage allocation.

The findGlobals script also contains a list of all valid definitions that cause allocation of memory. Unique valid entries are checked to see if they are initialized or uninitialized. Relevant information is extracted from the output of CSCOPE.

The purpose of the script examineGlobals and examineGlobalsConst is to use CSCOPE interactively to examine the encapsulation and, if desired, change the default encapsulation decision for global variables. In examinGlobalConsts the user can use CSCOPE and interactively change the default encapsulation decision for an uninitialized global variable which is "no". The script input is from files in the GlobalConst subdirectories. The script uses CSCOPE to put the user in the file where the variable is defined. The user can examine the occurrence of the variable in CSCOPE and decide whether to retain the default ("no") or change it to "yes" in which case the variable will be encapsulated even though it is initialized.

After identification and targeting as described above, individual global variables can be replaced with a more suitable encapsulated representation, such as an array associating each element of the array with a separate object instance. The index to the array of the VRT is resolved at run time when legacy functions containing references to the encapsulated data are invoked. This can be done in a number of ways. The index to the array can be passed as an argument to the function on the stack. Alternatively, each object instance can be mapped to a separate thread of execution and the array index can be stored and retrieved as a private thread data by means of a system call to the operating system. Most operating systems support this feature. In the preferred embodiment the following script files were used to implement Step II.

The script findOcc is used to generate a list of all occurrences of global variables, find all code references of global variables and store them into separate files depending on the type of reference (i.e. external declaration and statement references). It uses a single list of uninitialized and initialized global variables found using the script findGlobals. It uses single search with line oriented output to find occurrences. These occurrences are either "extern" declarations or code references. These are stored in separate files in a reference directory with a file name suffix that indicates directory. Typical lines in these files includes:

InvokeIDctr:/vobs/amas24/sw/SLC5/am-asn/src/asn-proc-rsp.c:169 indicating variable name, file number and line number where the occurrence was found.

FindOcc uses the list to construct the file name to be examined. The fourth position stores default encapsulation e.g.

Asma_tid:unsigned long Asna_tid:/vobs/amas24/sw/SLC5/sw/am-asn1/tsk_ASNA.c:171:yes.

The script sets a variable (ARGV) which contains the name of the directory to be encapsulated such as "am-asn1." If the variable is to be encapsulated, the sub routine "find-occurences" is implemented to do the job. The subroutine finds a list of occurrences of a global variable using CSCOPE and stores external declaration and references in statement in separate files.

The purpose of the script modificationDB is to determine all changes that must be made to an individual source file in order to allow the script Encapsulate to perform appropriate editing of files in a single pass. In order to achieve this purpose the script develops a line number sorted list of all modifications that must be made in order to effect legacy code encapsulation. It allows all modifications to be done with a single pass over the file.

Two other scripts, findGlobals and findOcc find lists of uninitialized variable external declarations and statement references and compile them into separate files. However, it is not easy to use each file separately because some encapsulation actions may cause the line in the source file to change, invalidating the data stored in another file. In addition, four separate passes over each source file would be required to make appropriate modifications for initialized globals, uninitialized globals external declarations and statement references.

As an alternative, this script can be used to identify all modifications that are needed in order to encapsule variables occurring in a single directory. The modifications in. each file are sorted based on line number and the required changes are stored in files with a suffix that identifies the source file. The output of this file is used by the script Encapsulate to make all identified modifications. Modification records are stored in files with the following conventions:

1. E.g. /vobs/amas24/sw/SLC5/encap_data/modifications/am-asn1/contains all changes resulting from encapsulation of the am-asn1 directory. Note that encapsulating a directory may result in changes to files in another directory because a global variable defined in am-asni may be referenced in am-oipr.
2. E.g. /vobs/amas24/SLC5/encap_data/modifications/am-asn1/oipr_mcreate.c contains as a result of encapsulating globals in am-ans1.

Typical outputs such as in oipr_mcreate.c are shown below:

local_config:88:/vobs/amas24/sw/SLC5/am-oipr/src/oipr_mcreate.c: externs;

local_config:127:/vobs/amas24/swSLC5/am-oipr/src/oipr_mcreate.c:externs;

local_config:127:/vobs/amas24/sw/SLC5/am-oipr/src/oipr_mcreate.c:references;

local_config:235/vobs/amas24/sw/SLC5/am-oipr/src/oipr_mcreate.C:references.

The entries indicate variable name, line number, file name and the type of occurrence respectively. Depending on the type of occurrence an appropriate action will be taken as described in the script Encapsulate.

Any known method of sorting lines can be used. However, a suitable method is where the script reads files in directories one by one. The file containing the list of modifications can be checked for globals/globconsts ,to see if encapsulation is desired. The file MODFILE is created to contain the modified records. Modfile is sorted based on the line number to be modified. Two hash tables (associated arrays) are created with key=0–n number. Two tables are used to handle cases where two separate modifications need to be done on a single line.

The purpose of the script Encapsulate is to use the output file of the file modificationDB to take appropriate encapsulation action on source files in one pass.

The script performs appropriate encapsulation actions on source files in legacy directories.

1. Global variable definitions are commented out;
2. External declarations of global variables are commented out;
3. References to global variables in C statements are commented out and replaced by the corresponding reference to an array variable. The index of the array denotes the VRT number and is resolved at run-time either by passing the index on the stack or by system calls to the operating system to retrieve the index as private thread data (PTD).

Entries in files in the modifications directory correspond to changes that need to be made by making a single pass over source files. File entries are sorted by line number and are read sequentially. For multiple modifications per line, the line number at which the modifications need to take place is incremented only after the last modification.

All lines in the file contain the same full path name. So the directory where the file resides only needs to be found once.

A subroutine NewLineList contains line by line copy of the file with all modifications. Lines that are commented out and already contain C-type (/* */) comments must be handled separately. First, the comment portion is removed and then it is appended once the C statement itself is commented out. However, there is no need to handle this when handling multiple modifications on a single line. It was already commented out. When a line is commented out the original comments are left in the source file. The process for commenting out global also applies to references and externs.

The purpose of the script createstruct is to create structures in the header file diamond.h that will be used by encapsulated code. All lines including modifications are printed in a tmp file and then replace the original file. The create structure script adds to the header file diamond.h a structure corresponding to all the globals that are to be encapsulated in directories specified on the command line.

Modifications and variations to the above identified described invention will be apparent to one skilled in the artl reading this disclosure. All such modifications and variations are intended to fall within the scope and spirit of the invention, limited solely by the appended claims.

What is claimed is:

1. A method for data encapsulation in large scale legacy software code comprising the steps of:

(a) generating a symbol table output from the legacy software code;

(b) automatically scanning the symbol table to determine global variables therein;

(c) replacing the global variables with an object for use in one or more separate object instances; and (d) moving each object instance to a separate thread of execution wherein the encapsulated representation is in the form of an array indexed for real time access when large legacy functions containing references to encapsulated representations are involved, the index of an array is passed as an argument to a function on a stack and the array is stored and retrieved as a private thread data.

2. The method of claim 1 wherein the array index is accessed by a call to the operating system.

3. The method of claim 1 wherein step (b) is implemented using a set of scripts that directly manipulate source code.

4. The method of claim 3 wherein the scripts are perl scripts.

5. The method of claim 1 wherein scanning is carried out by a browser.

6. The method of claim 1 wherein the symbol table output is generated by a compiler.

7. The method of claim 1 wherein the browser is Cscope.

8. The method of claim 1 wherein step (b) is implemented using a set of scripts that directly manipulate source code.

9. The method of claim 1 wherein the scripts are perl scripts.

* * * * *